(12) United States Patent (10) Patent No.: US 7,921,120 B2
Podilchuk (45) Date of Patent: Apr. 5, 2011

(54) METHOD AND SYSTEM FOR IMAGE RECOGNITION USING A SIMILARITY INVERSE MATRIX

(75) Inventor: Christine Podilchuk, Warren, NJ (US)

(73) Assignee: D&S Consultants, Eatontown, NJ (US)

( * ) Notice: Subject to any disclaimer, the term of this patent is extended or adjusted under 35 U.S.C. 154(b) by 127 days.

(21) Appl. No.: 11/948,072

(22) Filed: Nov. 30, 2007

(65) Prior Publication Data

US 2008/0133521 A1   Jun. 5, 2008

Related U.S. Application Data

(60) Provisional application No. 60/861,932, filed on Nov. 30, 2006.

(51) Int. Cl.
*G06F 17/00* (2006.01)
(52) U.S. Cl. ........................ 707/749; 707/748
(58) Field of Classification Search ............... 707/1–10, 707/102, 749, 748
See application file for complete search history.

(56) References Cited

U.S. PATENT DOCUMENTS

| | | | |
|---|---|---|---|
| 4,503,557 A | 3/1985 | Maeda | |
| 4,901,362 A | 2/1990 | Terzian | |
| 5,459,739 A | 10/1995 | Handley | |
| 5,751,286 A | 5/1998 | Barber | |
| 5,757,959 A | 5/1998 | Lopresti | |
| 5,761,538 A | 6/1998 | Hull | |
| 5,832,474 A | 11/1998 | Lopresti et al. | |
| 5,875,446 A | 2/1999 | Brown | |
| 5,901,244 A * | 5/1999 | Souma et al. | 382/190 |
| 5,940,778 A | 8/1999 | Marfurt | |
| 6,104,835 A | 8/2000 | Han | |
| 6,161,130 A | 12/2000 | Horvitz | |
| 6,295,371 B1 | 9/2001 | Rucklidge | |
| 6,581,034 B1 | 6/2003 | Choi et al. | |
| 6,616,704 B1 | 9/2003 | Birman | |
| 6,629,097 B1 * | 9/2003 | Keith | 707/5 |
| 6,633,857 B1 | 10/2003 | Tipping | |
| 6,647,139 B1 * | 11/2003 | Kunii et al. | 382/159 |
| 6,741,725 B2 | 5/2004 | Astle | |
| 6,775,411 B2 * | 8/2004 | Sloan et al. | 382/224 |
| 6,847,966 B1 * | 1/2005 | Sommer et al. | 707/739 |
| 6,898,469 B2 | 5/2005 | Bickford | |
| 6,915,009 B2 | 7/2005 | Foote | |
| 6,944,602 B2 | 9/2005 | Cristianini | |

(Continued)

FOREIGN PATENT DOCUMENTS

EP   0949580   2/2001

OTHER PUBLICATIONS

Podilchuk, "A New Face Recognition Algorithm Using Bijective Mappings" 2005 IEEE Comp Soc Conf on Comp Vision and Pattern Recogn, Jun. 20-26, 2005, vol. 3, pp. 165 US.

(Continued)

*Primary Examiner* — Mohammad Ali
*Assistant Examiner* — John P Hocker
(74) *Attorney, Agent, or Firm* — Fox Rothschild LLP; Dennis M. Carleton

(57) ABSTRACT

A method and system for recognizing images are described. Embodiments of the invention apply techniques of the Levenshtein algorithm for matching or searching one-dimensional strings for comparing graphical contents of 2D images.

25 Claims, 3 Drawing Sheets

U.S. PATENT DOCUMENTS

| | | | |
|---|---|---|---|
| 6,990,217 B1 | 1/2006 | Moghaddam | |
| 7,054,847 B2 | 5/2006 | Hartman | |
| 2001/0045979 A1* | 11/2001 | Matsumoto et al. | 348/43 |
| 2002/0028021 A1* | 3/2002 | Foote et al. | 382/224 |
| 2002/0064149 A1* | 5/2002 | Elliott et al. | 370/352 |
| 2002/0078043 A1* | 6/2002 | Pass et al. | 707/6 |
| 2003/0026484 A1* | 2/2003 | O'Neill | 382/224 |
| 2003/0108223 A1* | 6/2003 | Prokoski | 382/115 |
| 2004/0133927 A1* | 7/2004 | Sternberg et al. | 725/136 |
| 2004/0221237 A1* | 11/2004 | Foote et al. | 715/700 |
| 2004/0243567 A1* | 12/2004 | Levy | 707/3 |
| 2005/0022114 A1* | 1/2005 | Shanahan et al. | 715/513 |
| 2005/0125376 A1* | 6/2005 | Curtis et al. | 707/1 |
| 2005/0129290 A1 | 6/2005 | Lo | |
| 2005/0147302 A1 | 7/2005 | Leung | |
| 2006/0107823 A1 | 5/2006 | Platt | |
| 2006/0112068 A1 | 5/2006 | Zhang | |
| 2006/0251339 A1 | 11/2006 | Gokturk | |
| 2007/0061301 A1* | 3/2007 | Ramer et al. | 707/3 |
| 2007/0294612 A1* | 12/2007 | Drucker et al. | 715/500.1 |
| 2008/0077570 A1* | 3/2008 | Tang et al. | 707/5 |

OTHER PUBLICATIONS

Hsuan Shih, Lee, "A Fast Algorithm for Computing the Transitive Closure [etc]," IEEE Proc of the Int ICSC Cong on Comp Intel Meth and Appl, pub. 1999 (Jun. 22-25, 1999) US.

Bhatnagar et al "Syntactic Pattern Recognition of HRR Signatures," SPIE Proc. v 4053, 190, pp. 452-466, Soc of Photo-Opt Instrum Engineers, Bellingham WA (2000).

Oommenn et al "On Using Parametric String Databases and Vector Quantization [etc]," IEEE Proc. Int. Conf. on Sys, Man and Cyber, v 1, p. 511-517 IEEE, Piscataway NJ (1997).

Chen, "Fast Schemes for Computing Similarities Between Gaussian HMMs [etc]" EURASIP Jour on Appl Sign Pro (EURASIP J. Appl. Sig Pro v 2005, n13, Aug. 1, 2005 p. 1984-1993 US.

Asano, "Efficient Algorithms for Optimization-Based Image Segmentation" (NDN-174-0695-5802-4) IEEE Int Jour of Comp Geo & App, v11, No. 2, 2001 p. 145-166 US.

Menico, "Faster String Searches (Boyer-Moore Algorithm)" Dr. Dobb's Jour of Software Tools, v14 n7 pub Jul. 1989 p. 74-78 (US).

* cited by examiner

METHOD AND SYSTEM FOR IMAGE RECOGNITION USING A SIMILARITY INVERSE MATRIX

CROSS-REFERENCE TO RELATED APPLICATIONS

This application claims benefit of U.S. provisional patent application Ser. No. 60/861,932, filed on Nov. 30, 2006, which is herein incorporated by reference.

FIELD OF THE INVENTION

The present invention relates generally to the field of techniques for analyzing graphical data and, in particular, methods and systems for computerized recognition of objects of interest in graphical contents of 2D images.

BACKGROUND OF THE INVENTION

Recognition of objects of interest (referred to herein as "targets") in graphical contents of 2D images is used by military, law enforcement, commercial, and private entities. Typically, the goal of target recognition is identification or monitoring of one or more targets depicted in images produced by surveillance apparatuses or images stored in respective databases or archives. In various applications, target recognition may be performed in real time or, alternatively, using pre-recorded data.

It has been recognized in the art that there are difficulties associated with computerized, i.e., automated, comparing of the graphical contents of images. In particular, many challenges in the field of computerized target recognition relate to identification of targets that change their appearance due to orientation, lighting conditions, or partial occlusions.

Despite the considerable effort in the art devoted to techniques for computerized image recognition, further improvements would be desirable.

SUMMARY OF THE INVENTION

One aspect of the invention provides a method for image recognition. The method is directed to determining a degree of similarity between a query image and reference images based on a value of a similarity score between the compared images, wherein the similarity score is defined as a complement to a pictorial edit distance, which is asserted as a weighted sum of a 2D representation of Insertion, Deletion, and Substitution Error terms of the Levenshtein algorithm for matching or searching one-dimensional data strings.

In one embodiment, the method comprises generating a matrix of similarity scores of the reference images, in which each reference image forms a diagonal matrix element and similarity scores of the reference images one versus another form non-diagonal matrix elements, and determining a similarity score of a query image versus a reference image. Then, the method calculates a similarity inverse matrix transforming the matrix of similarity scores in a diagonal identity matrix and a query vector. Elements of the query vector represent similarity scores between the query and reference images. The query vector is adjusted using the similarity inverse matrix and used to compare the query and reference images.

Another aspect of the present invention provides a system using the inventive method for image recognition.

Various other aspects and embodiments of the invention are described in further detail below.

The Summary is neither intended nor should it be construed as being representative of the full extent and scope of the present invention, which these and additional aspects will become more readily apparent from the detailed description, particularly when taken together with the appended drawings.

Figure 1:
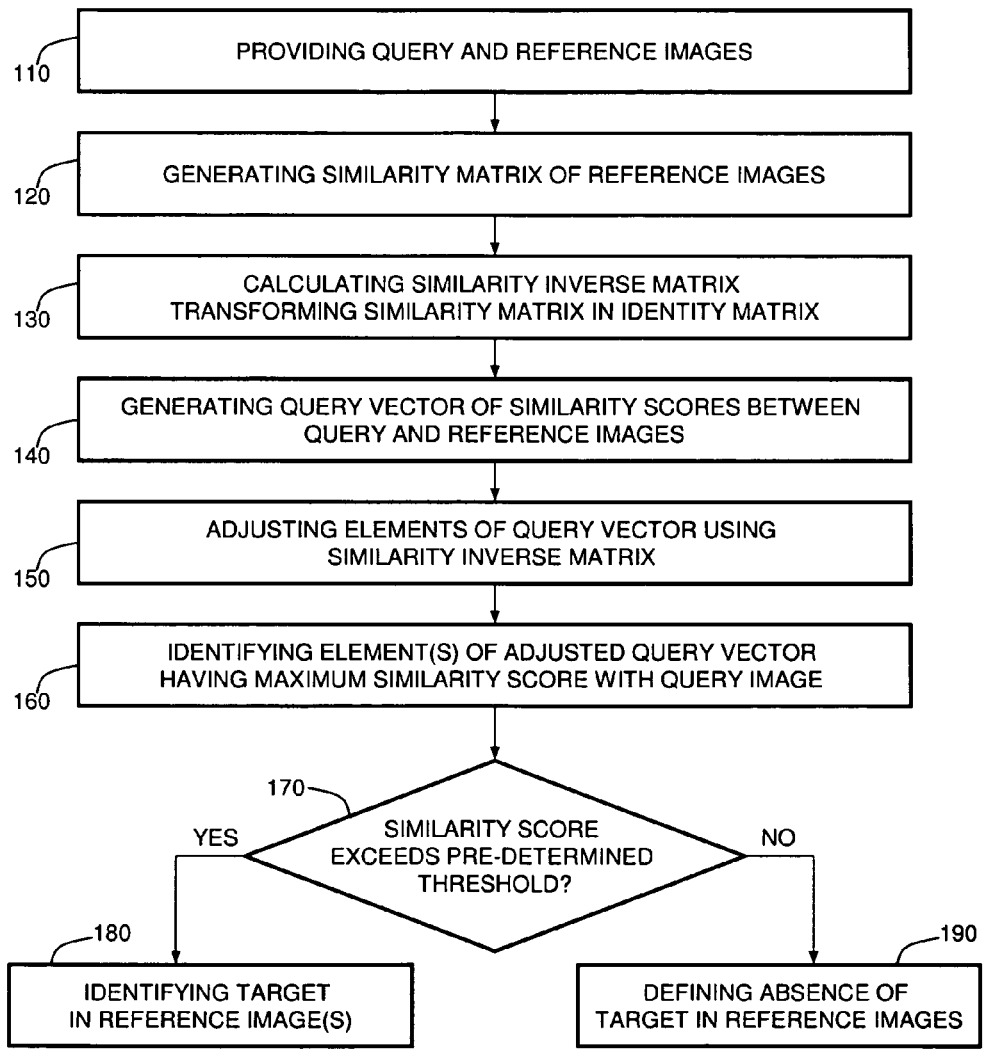
FIG. 1 is a flow diagram illustrating a method for recognizing images in accordance with one embodiment of the present invention.

To facilitate understanding, identical reference numerals have been used, where possible, to designate similar elements that are common to the figures, except that suffixes may be added, when appropriate, to differentiate such elements. The images in the drawings are simplified for illustrative purposes and have not necessarily been drawn to scale.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION

Figure 2:
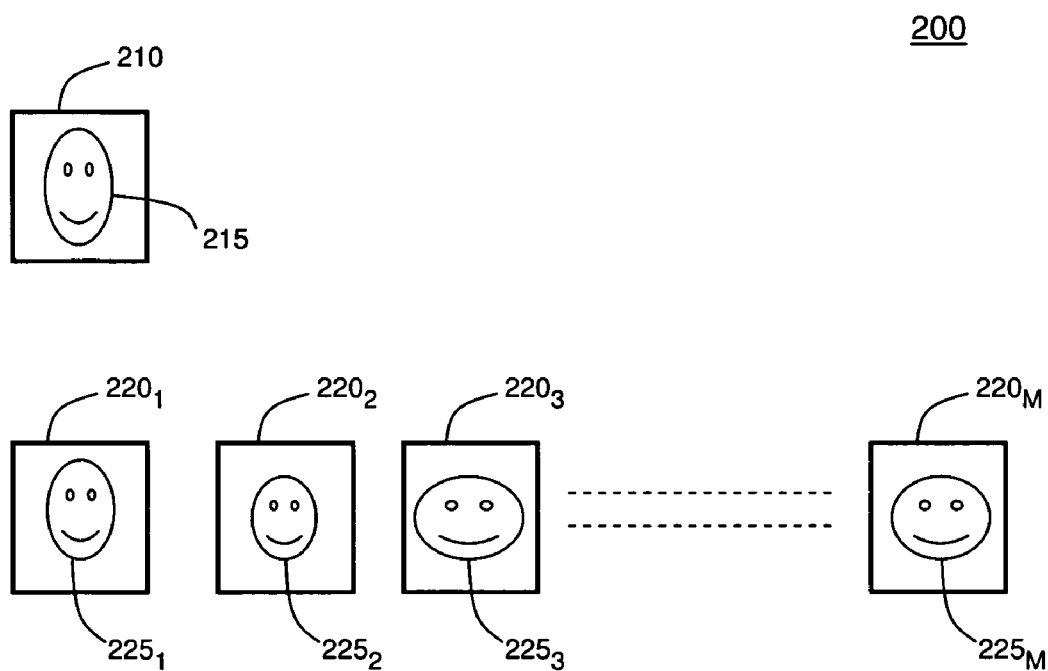
FIG. 2 is a schematic diagram depicting exemplary images compared using the method of FIG. 1.

Referring to the figures, FIG. 1 depicts a flow diagram illustrating a method 100 for recognizing images in accordance with one embodiment of the present invention, and FIG. 2 depicts a schematic diagram 200 illustrating the method 100. To best understand the invention, the reader should refer to FIGS. 1-2 simultaneously.

In various embodiments, method steps of the method 100 are performed in the depicted order or at least two of these steps or portions thereof may be performed contemporaneously, in parallel, or in a different order. For example, portions of steps 120, 130, and 140 may be performed contemporaneously or in parallel. Those skilled in the art will readily appreciate that the order of executing at least a portion of other discussed below processes or routines may also be modified.

Aspects of the present invention are illustratively described below within the context of images depicting live objects such as humans or body parts thereof. The invention may also be utilized within context of images depicting material objects, such as missiles or their plumes, vehicles, objects floating in air, free space, or liquid, beams of light, and the like, as well as images depicting a combination of various live or material objects. It has been contemplated and is within the scope of the invention that the method 100 is utilized within the context of such images.

At step 110, referring to FIG. 2, a 2D image 210 (referred to hereafter as a "query image") and a plurality of M pre-stored 2D images 220 (referred to hereafter as a "reference images") are provided, where M is an integer. In one embodiment, the reference images 220 are pre-stored in a database of a computerized system or apparatus for comparing images (discussed below in reference to FIG. 3).

Illustratively, each of the reference images 220 depicts a respective object 225 that is compared to a target 215 depicted in the query image 210. Generally, the target 215 and objects 225 are depicted surrounded by live or material elements of their respective conventional habitats, conditions, or environments. For a purpose of graphical clarity, in the images 210 and 220 such elements are not shown.

Herein, the method 100 is discussed referring to the reference and query images depicting a single object (reference images 220) or a single target (query image 210). In alternate embodiments, reference and query images depicting several such objects or targets may similarly be compared using processing steps of the method 100.

In the depicted exemplary embodiment, the query and reference images 210, 220 are digitized 2D images having the same digital resolution (i.e., number of pixels per unit of area), and their graphical contents (i.e., target 215 and objects 225) have approximately the same physical dimensions, or scale factors.

Generally, at least a portion of these properties in available samples of query and reference images may differ from one another or at least one of the query and reference images 210, 220 may be a portion of a larger image plane. At step 110, respective properties of such query and reference images are normalized.

In particular, a normalization process may adjust scale factors or digital resolution of the query or reference images, equalize or approximately equalize physical dimensions of particular elements in the images or the images themselves, produce copies of the query and reference images having different digital resolutions, and the like. Such normalization of the images increases probability and reduces computational complexity of recognizing the target 215 in graphical contents of the reference images 220.

At step 120, a similarity matrix SM of the reference images 220 is generated, $$SM = \begin{pmatrix} S_{11} & \cdots & S_{1M} \\ \vdots & \ddots & \vdots \\ S_{M1} & \cdots & S_{MM} \end{pmatrix}. \quad \text{(Eq. 1)}$$

Matrix elements $S_{ij}$ of the similarity matrix SM are defined as similarity scores between reference images $220_i$ and $220_j$, where i and j are integers and i+j=M. In the similarity matrix SM, each reference image 220 forms a diagonal matrix element, and similarity scores of the reference images 220 one versus another form non-diagonal matrix elements.

Diagonal matrix elements (i.e., matrix elements $S_{ii}$ or $S_{jj}$) relate to similarity scores of the respective reference images versus themselves and, as such, are unity matrix elements (i.e., matrix elements which numerical value is equal to 1). Correspondingly, since similarity scores $S_{ij}$ and $S_{ij}$ for the respective reference image $220_{ij}$ and $220_{ji}$ are equal to one another, the similarity matrix 300 is a symmetric matrix. Numerical value of the non-diagonal matrix elements is disposed in a range from 0 to 1.

A similarity score between reference images $220_i$ and $220_j$ is defined as a complement to a pictorial edit distance (PED), which is asserted as a weighted sum of a 2D representation of Insertion, Deletion, and Substitution Error terms of the Levenshtein algorithm for matching or searching one-dimensional data strings. Techniques for determining PEDs and similarity scores are disclosed in detail in commonly assigned U.S. patent application Ser. No. 11/61,913, filed on Jan. 2, 2007, and Ser. No. 11/619,092, filed on Jan. 2, 2007, all of which are herein incorporated by reference. Techniques for determining PEDs and similarity scores and comparing images using these properties are further disclosed in the commonly assigned U.S. patent applications by C. Podilchuk entitled "Method and System for Comparing Images Using a Pictorial Edit Distance," filed simultaneously herewith on this date, and "Method and System for Searching Multimedia Content," simultaneously filed herewith on this date, the contents all of which are incorporated herein by reference. Salient features of these techniques are briefly discussed below.

To determine the similarity score between reference image $220_i$ and $220_j$, an image disparity map is calculated for these images using a respective block matching algorithm. Using cost functions such as, for example, a mean absolute difference (or L1 error) or a mean square error (or L2 error), the image disparity map identifies disparity between pre-selected elementary blocks of pixels in the reference image $220_i$ and $220_j$ as a weighted sum of the one-to-many, one-to-none, and matching error correspondences between the blocks of pixels.

These types of correspondences are expressed in terms of the Levenshtein algorithm as follows: (i) one-to-many correspondence between the elementary blocks is asserted as an equivalent of an Insertion term, (ii) one-to-none correspondence between the elementary blocks is asserted as an equivalent of a Deletion term, (iii) partial matching between the elementary blocks is asserted as an equivalent of a Substitution Error term, and (iv) a PED between the compared images is asserted as an equivalent of the Levenshtein's Edit Distance.

The term "one-to-many correspondence" relates to an elementary block matching, with a cost function smaller than a first pre-determined threshold Q1, two or more elementary blocks of the other image. Accordingly, the term "one-to-none correspondence" relates to an elementary block having no match among the elementary blocks of the other image (i.e., elementary block which cost function, with respect to the elementary blocks of the other image, is greater than a second pre-determined threshold Q2). The term "partial matching" relates to the elementary blocks which cost functions, with respect to the elementary blocks of the other image, are disposed between Q1 and Q2, i.e., $Q1 \leq Q \leq Q2$.

At step 130, using the similarity matrix SM, an inverse similarity matrix SIM is calculated. The inverse similarity matrix SIM is a matrix that, when multiplied by the similarity matrix SM, forms a unitary diagonal identity matrix IM, i.e., $$(SIM) \cdot (SM) = IM. \quad \text{(Eq. 2)}$$

In the identity matrix ID, all diagonal elements equal to 1 and non-diagonal elements equal to 0.

At step 140, a query vector V is generated, $$V = \begin{bmatrix} V_{q1} \\ V_{q2} \\ -- \\ V_{qM} \end{bmatrix}. \quad \text{(Eq. 3)}$$

Elements $S_{qk}$ of the query vector V are selectively defined as similarity scores between the query image 210 and a respective reference image $220_k$, where k is an integer in a range from 1 to M.

At step 150, using the inverse similarity matrix SIM, an adjusted query vector $V_{ADJ}$ is calculated as a product of the vector V and the inverse similarity matrix SIM, i.e., $$V_{ADJ} = V \cdot (SIM). \quad \text{(Eq. 4)}$$

Each element of the adjusted query vector $V_{ADJ}$ corresponds to an adjusted value of a similarity score between the query image 210 and the respective reference image $220_k$.

At step 160, an element (or elements) of the adjusted query vector $V_{ADJ}$ having a largest similarity score $S_{max}$ among all elements of the vector $V_{ADJ}$ is (are) defined.

At step 170, the method 100 queries if the similarity score $S_{max}$ exceeds a pre-selected threshold T for numerical values of the similarity scores. If the query of step 170 is affirmatively answered, the method 100 proceeds to step 180, where the method 100 identifies the target 215 in the query image 210 as the object(s) 225 depicted in the reference image(s) 220 having the similarity score $S_{max}$. If the query of step 170 is negatively answered, the method 100 proceeds to step 190, where the method 100 defines absence of the objects 225 in the query image 210, i.e., determines that the objects 225 are not the target 215.

In a further embodiment, the query image 210 may be compared against the reference images 220 at least a portion of which is morphed using respective graphics software to examine how such variations relate to the similarity scores between the target 225 and the objects 215. In particular, such graphics software may produce morphed reference images 220 where lighting conditions, poses, or attributes (for example, clothing, hand-held or wearable objects, and the like) of the objects 225 are selectively modified.

In another embodiment, a plurality of the query images $210_n$, where n is an integer and n>1, may similarly be compared against the reference images 220. In yet another embodiment, a plurality of thresholds T may be defined to identify particular groups of the reference images (for example, groups which similarity scores with the respective query image(s) 210 correspond to pre-selected ranges of the similarity scores).

In exemplary embodiments, the method 100 may be implemented in hardware, software, firmware, or any combination thereof in a form of a computer program product comprising computer-executable instructions. When implemented in software, the computer program product may be stored on or transmitted using a computer-readable medium adapted for storing the instructions or transferring the computer program product from one computer to another.

Figure 3:
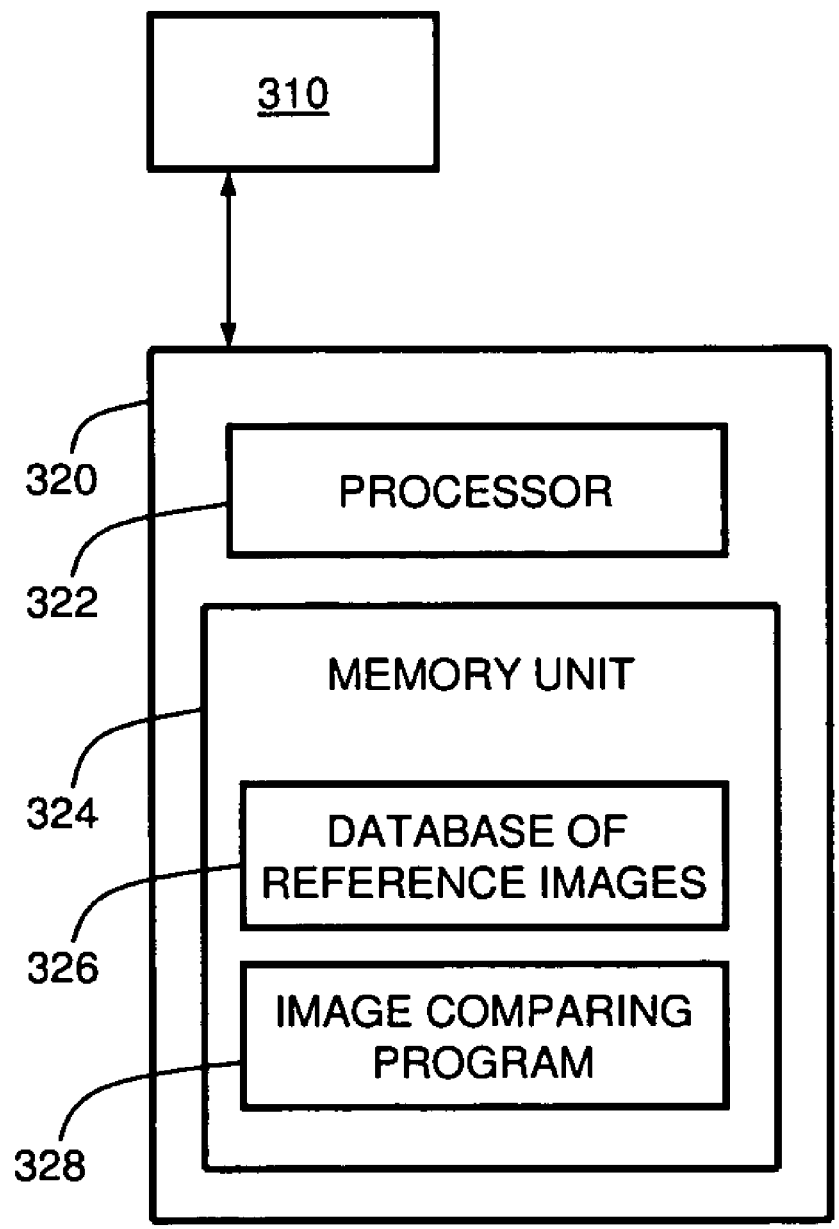
FIG. 3 is a high-level, schematic diagram of an exemplary system using the method of FIG. 1.

FIG. 3 is a high-level, schematic diagram of an exemplary system 300 using the method 100. The system 300 illustratively includes an analyzer 320 and a source 310 of one or more query images 210.

In one embodiment, the analyzer 320 is a computer having a processor 322 and a memory unit 324. The memory unit 324 includes a database 326 of reference images 220 and an image comparing program, or software, 328. The image comparing program 328 encodes, in a form of computer instructions, the method 100. When executed by the processor 322, the program 328 performs processing steps of the method 100. In an alternate embodiment, the database 326 may be a portion of a remote apparatus (not shown) coupled to the analyzer 320.

In alternate embodiments, at least some of the computer program 328 and database 326 of reference images 220 may reside on a removable magnetic or optical media (e.g., flash memory card or drive, compact disc (CD), DVD, Blu-Ray and/or HD optical disks and the like) (not shown) or any other storage medium (not shown), including magnetic media such has hard disk drives, tapes, and the like, including media coupled to the computer 320 by way of a network (not shown), such as a wide area network (WAN), local area network (LAN) or the Internet.

The source 310 is generally a digital video-recording device (for example, digital camera, digital video camera, and the like), an image-digitizing device (for example, a scanner), or a remote data storage adapted for communicating with the analyzer 320. In an alternate embodiment, the prove image(s) 210 may be selected from images contained in the database 326 (i.e., from reference images 220).

Although the invention herein has been described with reference to particular illustrative embodiments, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A computer readable medium storing software that, when executed by a processor, causes an apparatus or system to perform a method for recognizing images, the images including a query image and a plurality of reference images, comprising:
    (a) generating a matrix of similarity scores of the reference images, wherein the similarity score of each reference image versus itself forms a diagonal matrix element and similarity scores of the reference images one versus another form non-diagonal matrix elements;
    (b) calculating a similarity inverse matrix by transforming the matrix of similarity scores into a matrix that, when multiplied by said similarity matrix will yield an identity matrix in which said diagonal matrix elements are equal to 1 and said non-diagonal matrix elements are equal to 0;
    (c) generating a query vector having as each element a similarity score of the query image versus one of said reference images;
    (d) calculating an adjusted query vector equal to the product of said query vector and said similarity inverse matrix; and
    (e) using said adjusted query vector to compare the query and reference images;
    wherein the query image is a two-dimensional image and each of the reference images is a pre-stored two-dimensional image.

2. The method of claim 1, wherein the query and reference images are presented in digital formats.

3. The method of claim 2, further comprising:
    matching at least one of a digital resolution or a scale factor of the query image with a digital resolution and a scale factor of the reference images.

4. The method of claim 1, wherein the query image or at least some of the reference images are portions of larger image planes.

5. The method of claim 1, further comprising:
    morphing at least a portion of the reference images.

6. The method of claim 5, wherein the morphing step comprises:
    modifying at least one of lighting conditions, poses, or attributes of elements of graphical contents of the reference images.

7. The method of claim 5, wherein the step (a) further comprises:
    generating the matrix of similarity scores that includes morphed reference images.

8. The method of claim 1 wherein said similarity scores are defined as a complement to a pictorial edit distance, which is asserted as a weighted sum of a 2D representation of Insertion, Deletion, and Substitution Error terms of a distance metric algorithm for matching or searching one-dimensional data strings.

9. A system for recognizing images, comprising:
    a processor;
    a computer-readable medium;

a database of graphical data, said data including reference images;

a source of one or more query images; and software, stored on said computer-readable medium for execution on said processor, said software performing the steps of:

(a) generating a matrix of similarity scores of the reference images, wherein the similarity score of each reference image versus itself forms a diagonal matrix element and similarity scores of the reference images one versus another form non-diagonal matrix elements;

(b) calculating a similarity inverse matrix by converting the matrix of similarity scores into a matrix that, when multiplied by said similarity matrix will yield an identity matrix in which said diagonal matrix elements are equal to 1 and said non-diagonal matrix elements are equal to 0;

(c) generating a query vector having as each element a similarity score of the query image versus one of said reference images;

(d) calculating an adjusted query vector equal to a product of the query vector and the similarity inverse matrix; and (e) using the adjusted query vector to compare the query and reference images; wherein the query image is a two-dimensional image and each of the reference images is a pre-stored two-dimensional image.

10. The system of claim 9, wherein said database is stored on said computer-readable medium.

11. The system of claim 9, wherein said database is a portion of a remote apparatus.

12. The system of claim 9, wherein the source of the one or more query images is a portion of the database.

13. The system of claim 9, wherein the source of the one or more query images is a remote device.

14. The system of claim 13, wherein said device is a digital video-recording device, an image-digitizing device, or a remote data storage.

15. The system of claim 9, wherein the query image or at least some of the reference images are portions of larger image planes.

16. The system of claim 9, wherein said software further performs the steps of:

identifying a reference image having a highest similarity score with the query image; and recognizing graphical contents of the query image and said reference image as identical when the highest similarity score is greater than a pre-selected threshold.

17. The system of claim 9, wherein said software further performs the steps of:

morphing at least a portion of the reference images; and generating the matrix of similarity scores that includes morphed reference images.

18. The system of claim 9 wherein said similarity scores are defined as a complement to a pictorial edit distance, which is asserted as a weighted sum of a 2D representation of Insertion, Deletion, and Substitution Error terms of a distance metric algorithm for matching or searching one-dimensional data strings.

19. The method of claim 8 wherein said distance metric algorithm is the Levenshtein algorithm.

20. The system of claim 18 wherein said distance metric algorithm is the Levenshtein algorithm.

21. The method of claim 8, wherein the pictorial edit distance is determined using a pre-determined block matching algorithm for comparing (i) matrices of blocks of pixels of the reference images or (ii) matrices of blocks of pixels of the query image and the reference images.

22. The method of claim 21, wherein a degree of correlation between the blocks of pixels is expressed using the terms of the Levenshtein algorithm as follows:

defining one-to-many correspondence between the blocks of pixels as an equivalent of an Insertion term;

defining one-to-none correspondence between the blocks of pixels as an equivalent of a Deletion term; and defining a cost function associated with partial matching between the blocks of pixels as an equivalent of a Substitution Error term.

23. The method of claim 22, further comprising:

asserting the one-to-many correspondence between the blocks of pixels when a value of the cost function is smaller than a first pre-determined threshold;

asserting the one-to-none correspondence between the blocks of pixels when a value of the cost function is greater than a second pre-determined threshold; and asserting partial correspondence between the blocks of pixels when a value of the cost function is disposed between the first and second pre-determined thresholds.

24. The method of claim 23, wherein the value of the cost function is based on a mean absolute difference or a mean square error between the blocks of pixels.

25. The method of claim 24, further comprising the steps of:

identifying a reference image having a highest similarity score with the query image; and recognizing graphical contents of the query image and said reference image as identical when the highest similarity score is greater than a pre-selected threshold.

* * * * *